(12) United States Patent
Gaudette et al.

(10) Patent No.: US 11,374,836 B1
(45) Date of Patent: Jun. 28, 2022

(54) NETWORK LINK TESTING USING IP-IN-IP ENCAPSULATION

(71) Applicant: Microsoft Technology Licensing, LLC, Redmond, WA (US)

(72) Inventors: Jamie Dorea Gaudette, Kirkland, WA (US); Denizcan Billor, Seattle, WA (US); Tristan Naoki Struthers, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/117,017

(22) Filed: Dec. 9, 2020

(51) Int. Cl.
*H04L 12/26* (2006.01)
*H04L 43/0823* (2022.01)
*H04L 43/50* (2022.01)

(52) U.S. Cl.
CPC .......... *H04L 43/0823* (2013.01); *H04L 43/50* (2013.01)

(58) Field of Classification Search
CPC ............................ H04L 43/0823; H04L 43/50
USPC ....................................................... 370/252
See application file for complete search history.

(56) References Cited

U.S. PATENT DOCUMENTS

| | | | |
|---|---|---|---|
| 7,583,667 B2 | 9/2009 | Adhikari et al. | |
| 8,130,661 B2 | 3/2012 | Kannan et al. | |
| 9,654,375 B1 | 5/2017 | Pani | |
| 10,447,586 B2 | 10/2019 | Mirsky | |
| 10,498,591 B1 | 12/2019 | Ramana et al. | |
| 2004/0068681 A1 | 4/2004 | Smith | |
| 2007/0110034 A1* | 5/2007 | Bennett | H04L 45/24 370/352 |
| 2008/0186901 A1* | 8/2008 | Itagaki | H04W 92/18 370/315 |
| 2014/0071802 A1 | 3/2014 | Klimin et al. | |
| 2017/0331716 A1 | 11/2017 | Wu et al. | |
| 2019/0238366 A1 | 8/2019 | Conner et al. | |
| 2019/0246300 A1* | 8/2019 | Ko | H04B 17/318 |
| 2020/0336401 A1 | 10/2020 | Cociglio et al. | |

FOREIGN PATENT DOCUMENTS

| | | |
|---|---|---|
| CN | 1202638 C | 5/2005 |
| EP | 0387244 A1 | 9/1990 |
| JP | 2007274284 A | 10/2007 |
| JP | 2012147238 A | 8/2012 |

OTHER PUBLICATIONS

Phatak, et al., "IP-in-IP Tunneling to Enable the Simultaneous Use of Multiple IP Interfaces for Network Level Connection Striping", In Computer Networks: The International Journal of Computer and Telecommunications Networking, vol. 43, Issue 6, Dec. 20, 2003, pp. 787-804.

"International Search Report and Written Opinion Issued in PCT Application No. PCT/US21/055336", dated Jan. 24, 2022, 13 Pages.

* cited by examiner

*Primary Examiner* — Gbemileke J Onamuti
(74) *Attorney, Agent, or Firm* — Ray Quinney & Nebeker P.C; James Bullough (57) ABSTRACT

Increasing a resolution of an error rate detectable on a link between two network nodes includes transmitting an IP-in-IP encapsulated test packet back and forth between the two network nodes. The test packet includes a series of nested data packets having alternating destinations between the two network nodes. The test packet is transmitted on the data plane of the network, thereby increasing the resolution of the detectable error rate.

20 Claims, 7 Drawing Sheets

NETWORK LINK TESTING USING IP-IN-IP ENCAPSULATION

CROSS-REFERENCE TO RELATED APPLICATIONS

N/A

BACKGROUND

Network systems, such as cloud computing networks, the internet, or other networks, include various connections between two or more network nodes. Data travels between network nodes as discrete data packets. The data packets may include a header including routing information, such as a source Internet Protocol (IP) address, a destination IP address, information type, packet size, other information, and combinations thereof. Two network nodes may transmit the data packets over a link. During transmission over the link, one or more packets may be "dropped," or may leave the source network node, but not arrive at the destination network node. Dropped packets may result in incomplete data transfer between the first network node and the second network node, or may extend the data transfer and checking process. This may result in increased network traffic (to add redundancy and/or checking programs) and/or decreased customer satisfaction.

A network engineer and/or network administrator may transmit multiple sample data packets across the link to determine an error rate of the sample data packets. A single node may receive and send thousands, tens of thousands, hundreds of thousands, millions, or more, of data packets per minute. Acceptable error rates for a node may be one dropped packet per thousand, ten thousand, hundred thousand, million, or more transmitted packets. To test the drop rate of the link, the network engineer may send thousands, tens of thousands, hundreds of thousands, millions, or more sample packets. Sending this many sample packets may take significant amounts of time to complete. This may result in limited testing capacity for the link, reducing the resolution of the test link, which may lead to uncertainty regarding the actual error rate

SUMMARY

In accordance with one aspect of the present disclosure, a method is disclosed for increasing a resolution of an error rate detectable on a link between a network connection between a first network node and a second network node. The method further includes preparing a test packet. The test packet includes a plurality of nested data packets. Each nested data packet corresponds to a test instance. Each nested data packet includes a destination. The destination in successive nested data packets alternates between the first network node and the second network node. The method further includes transmitting the test packet back and forth between the first network node and the second network node across a data plane a plurality of times according to the destination in each nested data packet, thereby increasing a quantity of test instances relative to test transmissions on a control plane. The resolution of the error rate is based at least in part on the quantity of the test instances. The method further includes assessing a reliability of the link based at least in part on whether the test packet is received at a final destination. The reliability of the link is based at least in part on the resolution of the error rate.

Assessing the reliability of the link may include determining whether the test packet has been received at the final destination.

If the test packet does not arrive at the final destination, then the test packet may not have routed through each of the plurality of nested data packets.

The test packet may include at least two nested data packets having destinations of the first network node and at least two nested data packets having destinations of the second network node.

The test packet may include over 100 nested data packets alternating the destination between the first network node and the second network node.

Preparing the test packet may include preparing the test packet at the first network node.

Preparing the test packet may include preparing the test packet at a remote location separate from the first network node or the second network node.

A quantity of the plurality of nested data packets may be based on a maximum packet size of the first network node and the second network node.

The plurality of nested data packets may be nested Internet Protocol (IP) packets.

In accordance with another aspect of the present disclosure, a method is disclosed for increasing a resolution of an error rate detectable on a link between a network connection between a first network node and a second network node. The method further includes preparing a plurality of test packets. Each test packet of the plurality of test packets includes a plurality of nested data packets corresponding to a test instance. Each nested data packet in a test packet includes a destination. The destination in successive nested data packets in each test packet alternates between the first network node and the second network node. The method further includes transmitting each test packet of the plurality of test packets back and forth between the first network node and the second network node across a data plane a plurality of times according to the destination in each nested data packet, thereby increasing a volume of test instances relative to test transmissions on a control plane. The resolution of the error rate is based at least in part on a quantity of the test instances. The method further includes determining the error rate of the link based at least in part on a quantity of returned test packets of the plurality of test packets received at a final destination.

Determining the error rate of the link may include tracking which test packets of the plurality of test packets arrive at a final destination.

The resolution of the error rate may be based on a quantity of the plurality of nested data packets in each test packet of the plurality of test packets.

Each test packet of the plurality of test packets may include at least two nested data packets having destinations of the first network node and at least two nested data packets having destinations of the second network node.

Each test packet of the plurality of test packets may have the same plurality of nested data packets.

In accordance with another aspect of the present disclosure, a system is disclosed for increasing a resolution of an error rate detectable on a link between a network connection between a first network node and a second network node. The system includes one or more processors, memory in electronic communication with the one or more processors, and instructions stored in the memory. The instructions are executable by the one or more processors to prepare a plurality of test packets. Each test packet of the plurality of test packets includes a plurality of nested data packets corresponding to a test instance. Each nested data packet in a test packet includes a destination. The destination in successive nested data packets in each test packet alternates between the first network node and the second network node. The instructions are also executable by the one or more processors to transmit each test packet of the plurality of test packets back and forth between the first network node and the second network node across a data plane a plurality of times according to the destination in each nested data packet, thereby increasing a volume of test instances relative to test transmissions on a control plane. The resolution of the error rate of the link is based at least in part on a quantity of the test instances. The instructions are also executable by the one or more processors to determine the error rate of the link based at least in part on a quantity of returned test packets of the plurality of test packets received at a final destination.

The instructions may further cause the processor to track which test packets of the plurality of test packets arrive at the final destination when determining the error rate.

The resolution of the error rate may be based on a quantity of the plurality of nested data packets in each test packet of the plurality of test packets.

Each test packet of the plurality of test packets may include at least two nested data packets having destinations of the first network node and at least two nested data packets having destinations of the second network node.

Each test packet of the plurality of test packets may have the same plurality of nested data packets.

The test packet may be prepared at a remote location separate from the first network node and the second network node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 3-1 through 3-5 are representations of a test packet being transmitted between two network nodes, according to at least one embodiment of the present disclosure;

DETAILED DESCRIPTION

This disclosure relates to devices, systems, and methods for increasing the resolution of an error rate of a link between two network nodes. To test the error rate of the link, a single IP-in-IP encapsulated test packet may include multiple nested data packets having alternating destinations. The test packet is bounced back and forth between the first network node and the second network node over the data plane of the first network node and the second network node according to the headers of each nested data packet. If the test packet is not received at a final destination, then a nested data packet was dropped at some point between the first network node and the second network node, and the error rate may be approximately one dropped packet per the number of data packets. If the test packet is received at the final destination, then no data packets were dropped between the first network node and the second network node, and the error rate may be less than one dropped packet per the number of data packets.

Each nested data packet may represent or correspond to a single test instance of the link between the first network node and the second network node. As used herein, a test instance is a discrete test of the link between the two network nodes. When testing for connectivity errors (e.g., testing for dropped packets), a test instance is a single transmission of the test packet from a first network node to the second network node. By transmitting the test packet back and forth across the link based on alternating destinations of the nested data packets, a network engineer may test the network many times using a single test packet. This may allow the network engineer to increase the number of test instances used to test the link. Increasing the number of test instances may increase the resolution of the network test.

As used herein, IP-in-IP encapsulation protocol refers to preparing a data packet that has one or more nested data packets inside. An IP-in-IP data packet may include an initial packet header that provides generic information about the data packet, such as an initial destination and/or routing path. The initial header may include instructions for a first network node to remove the header and uncover the nested data packet encapsulated therein. The first network node may then treat the uncovered nested data packet as its own entity, disregarding the removed initial header. The nested data packet may include any information. For example, the nested data packet may include a nested header, which may include routing information, such as a destination IP address to a second network node and a source IP address of the first network node. The network node may transmit the data packet according to the nested header in the nested data packet to the second network node. The nested data packet may include instructions to remove the nested header, and the second network node may remove the nested header to find a second nested data packet having a second nested header, and the second network node may proceed to transmit the data packet according to the routing information in the second nested header. This process may be repeated until the data packet is sent to a final destination.

As used herein, a network node may include any computing device that is configured to be a part of a network. A network node may be configured to send and/or receive data packets from another connected network node. For example, a network node may include a switch, a router, a server, a personal computing device, a mobile computing device, or any other computing device.

A network node may be connected to one or more network nodes over a link. In some embodiments, two network nodes may be connected using a wired connection, a wireless connection, a satellite signal, the internet, any other connection type, and combinations thereof. In some embodiments, two network nodes may be part of a single network. In some embodiments, two network nodes may be part of separate networks. For example, a first node may belong to a first network, and a second node may belong to a second network, and information may be transferred between the first network and the second network over the link.

As used herein, the error rate of a test of the link between the two network nodes may refer to the rate at which a data packet fails to properly transfer from an origin node to a destination node. An error may include the link dropping the data packet. For example, the data packet may leave the origin node but fail to arrive at the destination node. In some examples, the data packet may fail to leave the origin node. In some embodiments, the error may include a corruption of data in the data packet that may prevent the data packet from properly arriving at the destination node. For example, a character in the destination IP address may be corrupted (e.g., changed, omitted, or added), resulting in the data packet not arriving at the destination node. In some embodiments, the error may include routing the data packet to the wrong destination. The error rate may be expressed as one error per number of packets transmitted. For example, the error rate may be 1 in 1,000, 1 in 10,000, 1 in 100,000, 1 in 1,000,000, or higher. The error rate may be tested by sending test packets until an error occurs, accounting for statistical variation. A network link may have an acceptable error rate, which may be an acceptable number of dropped packets per packets sent to maintain desired network reliability metrics.

As used herein, the reliability of a link between two network nodes may be an indication of whether a packet will be properly transmitted (e.g., transmitted without error) across the link. The reliability of the link may be related to the error rate. For example, a link having a low error rate (e.g., one error per more packets transmitted) may be more reliable than a link having a high error rate (e.g., one error per fewer packets transmitted). A reliable link may have a maximum acceptable error rate, which may be the maximum error rate allowed by a network engineer before the link is shut down for maintenance, discontinued, or upgraded with new hardware. For example, a reliable link may have a maximum acceptable error rate of 1 in 1,000,000, 1 in 100,000, 1 in 10,000, 1 in 1,000, or any value therebetween. In some examples, for a maximum error rate of 1 in 1,000, an error rate of 1 in 999 may be higher than the maximum error rate, and an error rate of 1 in 1,001 may be lower than the maximum error rate.

As used herein, the resolution of a test of a link between two network nodes may refer to the error rate detectable on the link between the two network nodes. A high resolution test may be able to test more packets over a testing period than a low resolution test. The test resolution may be related to the available testing bandwidth over the link. For example, if a test duration is one minute, and the testing bandwidth can support transfer of 100 test packets per minute, then the test has a resolution of 1 error in 100 packets. Similarly, if a test duration is one hour, and the testing bandwidth can support transfer of 1,000 test packets per minute, then the test has a resolution of 1 error in 60,000 packets.

In some situations, a testing program or protocol has a testing resolution that is greater than the maximum error rate. In this manner, the testing program may be able to perform sufficient tests to determine if the link is reliable (e.g., if the link has an error rate of less than the maximum error rate). In some situations, the testing program has a testing resolution that is less than the maximum error rate for the link. Put another way, the testing program may not be able to transmit enough packets to determine if the link has an error rate that is less than the maximum error rate. For example, a resolution of 1 error in 900 packets is a lower resolution than a maximum error rate of 1 in 1,000. In some examples, a resolution of 1 error in 1,100 packets is a higher resolution than the maximum error rate of 1 in 1,000.

In accordance with embodiments of the present disclosure, to increase the resolution of a network reliability test, the test packet may be transmitted over the data plane of the first network node and the second network node. Network nodes typically include a data plane (e.g., a forwarding plane) and a control plane (e.g., a management plane). Network traffic, including data packets, is routed through the data plane. The data plane may be optimized to quickly and efficiently transfer data packets to a destination (e.g., an IP address) identified in a destination header. The destination may be the next hop in a path or a final destination. The control plane may include forwarding rules, identify network topology, and provide other access to the network node and/or the network. However, the control plane may be optimized for processing of packets and other network information, rather than high-volume and/or high-speed packet forwarding.

Conventionally, the link between two network nodes may be tested by sending test transmission over the control plane. A control plane test transmission may include sending a test packet using internet control message protocol (ICMP) over the link using the control plane. However, ICMP messages may include information and/or other processing that is not directly related to determining whether an error occurred. Furthermore, because ICMP messages are transmitted over the control plane, the number of ICMP messages transmitted over a period of time may be limited. This may result in a lower resolution of a network reliability test, thereby limiting the testable error rate.

In accordance with embodiments of the present disclosure, IP-in-IP encapsulated test packets be transmitted over the data plane of the network nodes. In this manner, the test packet may be transmitted as normal network traffic, rather than an ICMP packet. Because of the increased packet transmission rate of the data plane, the resolution of link tests according to the present disclosure may be increased. This may result in lower detectable error rates, which may allow a network engineer to more precisely determine the error rate and/or the reliability of the network link. In some embodiments, transmitting the test packets over the data plane may increase the resolution of the network test to higher than the error rate, which may further assist in determining the error rate.

As discussed herein, the number of nested data packets encapsulated in a single test packet using IP-in-IP encapsulation may be determined at least partially by a maximum packet size of the first network device or a second network device. For example, if a maximum packet size for the first network device or the second network device is 9,000 bytes, and a data packet size is 20 bytes, then the number of nested data packets encapsulated by the test packet may be 450 (e.g., 9,000 divided by 20). In some embodiments, the maximum packet size may be configurable at the first network node and/or the second network node. In some embodiments, the number of nested data packets may be determined based on the lower maximum packet size of the first network node or the second network node. In some embodiments, the data packet may include any number of nested data packets, including 4, 5, 10, 50, 100, 250, 500, 750, 1,000, 2,500, 5,000, 7,500, 10,000, or more nested data packets. In some embodiments, the data packet may include a high volume of data packets. A high volume of data packets may be any volume of data packets that allows for a greater resolution of an error rate over the data plane than available over the control plane. In some embodiments, a high volume of data packets may include any number of nested data packets, including 4, 5, 10, 50, 100, 250, 500, 750, 1,000, 2,500, 5,000, 7,500, 10,000, or more nested data packets. In some embodiments, a nested data packet may be a nested IP packet. In other words, the nested data packets may include Internet Protocol (IP) headers, addresses, and other IP packet information.

According to embodiments of the present disclosure, the number of nested data packets may be greater than or equal to the maximum error rate. In this manner, a single test packet may include enough nested data packets to determine whether a network link is reliable according to the maximum error rate. For example, a single test packet may include 1,000 nested data packets, and the maximum error rate for a link may be 1 in 1,000. The single test packet may therefore have a resolution that is high enough to test the reliability of the network to within the maximum error rate.

In accordance with embodiments of the present disclosure, if an expected error rate is larger than a maximum number of nested data packets in a single test packet, then the link test may include multiple test packets. Increasing the number of test packets may therefore increase the resolution of the test to greater than the number of nested data packets within a single test packet. The link test may include a combined number of nested data packets for the multiple test packets. To test the reliability of the link, the network engineer may prepare and send sufficient test packets so that the combined number of nested data packets is greater than or equal to the desired test resolution. In this manner, the network engineer may test the reliability of the network link for network links having a maximum error rate that is greater than the quantity of nested data packets in a single test packet. Furthermore, this may allow a network engineer to run multiple tests to generate statistical information for the error rate of the network link.

Figure 1:
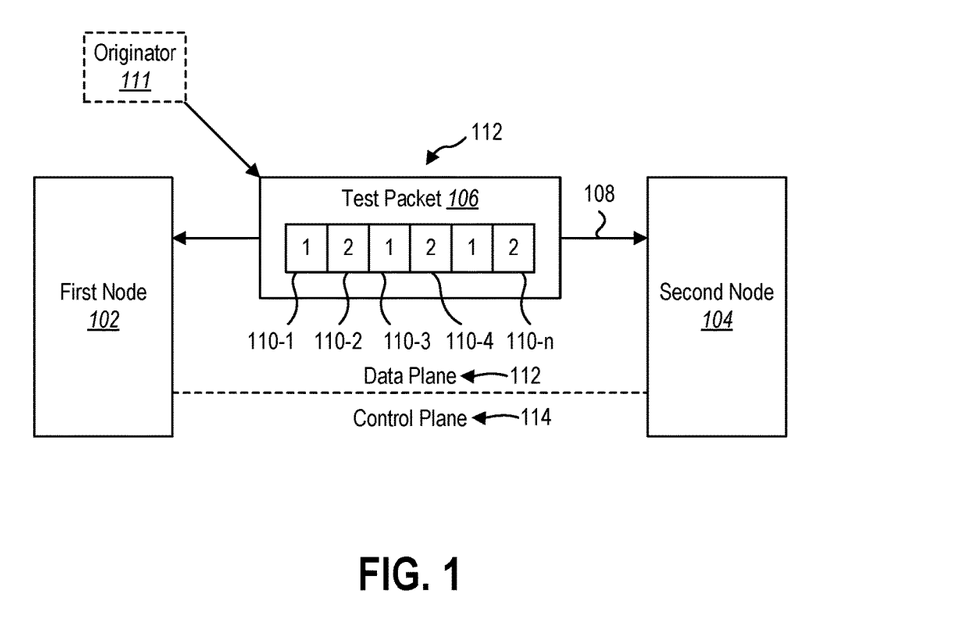
FIG. 1 is a representation of a network having a link between two network nodes to be tested, according to at least one embodiment of the present disclosure.

FIG. 1 is a representation of a network 100 including a first network node 102 and a second network node 104. A test packet 106 may be transmitted across a link 108 between the first network node 102 and the second network node 104. The link 108 may support two-way communication between the first network node 102 and the second network node 104. In other words, the test packet 106 may be transmitted along the link 108 from the first network node 102 to the second network node 104, and from the second network node 104 to the first network node 102.

The test packet 106 may encapsulate one or more nested data packets (collectively 110) according to IP-in-IP encapsulation protocol. The nested data packets 110 may each include a header having a destination IP address representing the first network node 102 and the second network node 104. When the test packet 106 arrives at one of the network nodes 102, 104, the network node 102, 104 may strip the header from the nested data packet 110, revealing the next nested data packet 110 and associated destination IP address.

For example, the test packet 106 may include a first nested data packet 110-1 having a destination of the first network node 102. When the test packet 106 arrives at the first network node 102, a first header for the first nested data packet 110-1 may include an instruction to remove the first header for the first nested data packet 110-1, revealing the second nested data packet 110-2. The second nested data packet 110-2 may include a second header having a destination of the second node 104. The first network node 102 may transmit the test packet 106 to the destination identified in the second header (e.g., the second network node 104). The second header may include an instruction to remove the second header, revealing the third nested data packet 110-3. The third nested data packet 110-3 may have a third header indicating a third destination of the first network node 102. The second network node 104 may transmit the test packet to the first network node 102 according to the third header. This process may be repeated, bouncing the test packet 106 back and forth between the first network node 102 and the second network node 104 until the test packet 106 is transmitted to a final destination revealed in an nth (e.g., final) nested data packet 110-n.

In some embodiments, the test packet 106 may bounce back and forth between the first network node 102 and the second network node 104 based on aligned inner headers in each of the nested data packets. In some embodiments, the destinations outlined in successive data headers may alternate between the first network node 102 and the second network node 104. For example, the first nested data packet 110-1 may have a first destination of the first network node 102. The second nested data packet 110-2 uncovered after the first nested data packet 110-1 may have a second destination of the second network node 104. The third nested data packet 110-3 uncovered after the second nested data packet may have a third destination of the first network node 102. A fourth nested data packet 110-4 uncovered after the third nested data packet 110-3 may have a fourth destination of the second network node 104. These destinations for successive nested data packets 110 may continue to alternate between the first network node 102 and the second network node 104 may continue until a final destination is outlined in the nth or final nested data packet 110-n.

In some embodiments, the test packet 106 may include at least two nested data packets 110 that have a destination of the first network node 102 and at least two nested data packets 110 that have a destination of the second network node 104. In this manner, the test packet 106 may bounce back and forth multiple times between the first network node 102 and the second network node 104.

Each nested data packet 110 may correspond to or represent a single test instance. Thus, by transmitting and/or bouncing the test packet 106 back and forth between the first network node 102 and the second network node 104, the test packet 106 may include multiple test instances. In this manner, the test packet 106 may provide multiple test instances (e.g., equal to the number of data packets 110) in a single test packet 106. This may increase the amount of test instances able to be performed in a single network test.

In some embodiments, the test packet 106 may be prepared an originator 111. In some embodiments, the originator 111 be any computing device in communication with the network 100. For example, the test packet 106 may be prepared by a remote computing device and transmitted to the first network node 102 or the second network node 104. In some examples, the test packet 106 may be prepared by the first network node 102 or the second network node 104. While the originator 111 is shown as a separate computing device, it should be understood that the originator 111 may be any computing device, including the first network node 102 or the second network node 104. Regardless, the test packet 106 may be prepared with a plurality of nested data packets having alternating destinations between the first network node 102 and the second network node.

Data may be transmitted between the first network node 102 and the second network node 104 along a data plane 112 and a control plane 114. In some embodiments, the data plane 112 may be optimized for data transfer, having a high transmission bandwidth (e.g., a high number of packets sent per minute). In some embodiments, the control plane 114 may be optimized for data processing, and may have a low transmission bandwidth (e.g., a low number, relative to the data plane 112, of packets sent per minute).

In some embodiments, the test packet 106 may be handled by the network 100 as regular network traffic. For example, regular network traffic is transmitted over the data plane 112. In this manner, the test packet 106 may be transmitted back and forth between the first network node 102 and the second network node 104 along the data plane 112. Each transfer of the test packet 106 from the first network node 102 to second network node 104 and from the second network node 104 to the first network node 102 represents a test instance. Because the data plane 112 has a higher transmission rate, transmitting the test packet 106 along the data plane 112 rather than the control plane 114 may increase the number of test instances that may be performed over a period of time. Put another way, transmitting the test packet over the data plane may increase the resolution of a link test, thereby increasing the maximum error that can be determined.

In some embodiments, the final nested data packet 110-*n* may have a final destination for the test packet 106. The final destination may be in communication with the originator 111 (e.g., the preparer or the provider) of the test packet 106. In some embodiments, the final destination may be the originator 111 of the test packet 106. In some embodiments, when the first network node 102 prepared the test packet 106, the final destination may be the first network node 102. In some embodiments, when a remote computing device prepared the test packet 106, the final destination may be the remote computing device. In some embodiments, when a remote computing device prepared the test packet 106, the final destination may be the first network node 102 or the second network node 104, and the final nested data packet 110 may include an instruction to have the first network node 102 or the second network node 104 communicate final receipt of the test packet 106 to the originator 111.

If the originator 111 receives the test packet 106 as the final destination, or receives notice of final receipt of the test packet 106, then each test instance (represented by each nested data packet 110) of the test packet 106 resulted in a successful transfer between the first network node 102 and the second node without error (e.g., without dropping the test packet 106). This may provide an indication of the reliability of the network link 108. For example, this may provide an indication that the network link 108, accounting for statistical variation, has an error rate of less than 1 in n, where n represents the number of nested data packets 110 encapsulated by the test packet 106.

If the originator 111 did not receive the test packet 106, either as the final destination or receive notice of final receipt of the test packet 106, then one test instance failed. Put another way, the test packet 106 was dropped during a transmission between the first network node 102 and the second network node 104. This may be an indication that the error rate is at least 1 in the number of test instances. This may further provide an indication of the reliability of the link 108 by indicating that at least one data packet may be dropped for the quantity of nested data packets 110 encapsulated in the test packet 106.

In some embodiments, the entire transmission of the test packet 106 (e.g., the bouncing back and forth of the test packet according to the alternating destinations of subsequent nested data packets 110) may occur over a period of time. The period of time may be related to the transmission rate (e.g., the bandwidth) of the first network node 102 and/or the second network node 104. In some embodiments, the period of time may be the transmission rate divided by the quantity of nested data packets 110. In some embodiments, the period of time may be longer than the transmission rate divided by the quantity of nested data packets 110. For example, the period of time may be at least partially based on a priority level of the test packet 106. For example, the test packet 106 may have a low priority, and the first network node 102 and/or the second network node 104 may prioritize transmission of other network traffic over the test packet 106. In some examples, the test packet 106 may have a regular priority, and the test packet 106 may be subject to the regular network traffic routing queues followed by the first network node 102 and/or the second network node 104.

In some embodiments, the originator 111 (e.g., a remote computing device, the first network node 102, the second network node 104) may determine a testing period. The testing period may be an indication of the amount of time the originator 111 expects a network test to take from the initial transmission of the test packet 106 to the receipt of the test packet 106 at the final destination. In some embodiments, the testing period may be determined by identifying the expected total transition time for the test packet 106 to be routed back and forth between the first network node 102 and the second network node 104. In some embodiments, the testing period may be a multiple (e.g., 1.1, 1.5, 2, 2.5, 3, 4, or more) of the expected total transition time, which may account for routing delays at the first network node 102 and/or the second network node 104.

In some embodiments, the originator 111 may determine that the test packet 106 was dropped if the test packet 106 has not arrived at the final destination within the testing period. As discussed herein, an error is a failed transmission of the test packet 106 from the first network node 102 to the second network node 104. Therefore, if the test packet 106 does not transmit from the first network node 102 to the second network node 104 at any hop from the first network node 102 to the second network node 104 or from the second network node 104 to the first network node 102, then the test packet 106 will not arrive at the final destination. To avoid a perpetual waiting situation, the originator 111 may determine that an error occurred in the transmission of the test packet 106 if the test packet 106 does not arrive at the final destination within the testing period.

In some embodiments, the originator 111 may provide multiple test packets 106 to test the reliability of the link 108. For example, if a maximum error rate is 1 in 100,000, and the maximum quantity of nested data packets 110 in a single test packet 106 is 1,000, then the originator may provide at least 100 test packets 106 to test the reliability of the link 108. This may result in a combined quantity of nested data packets 110 of 100,000. Because each nested data packet 110 corresponds to a single test instance, then the total combined quantity of test instances for the 100 test packets 106 is 100,000. If one of the test packets 106 does not arrive at the final destination, then the originator 111 may determine that that the error rate of the link 108 is at least 1 in 100,000. If more than one of the test packets 106 do not arrive at the final destination, then the originator 111 may determine that the error rate of the link 108 is greater than 1 in 100,000. If all of the test packets 106 arrive at the final destination, then the originator 111 may determine that the error rate of the link 108 is equal to or less than 1 in 100,000.

It should be noted that the error rate of the link 108 may be a statistical average. For example, if the error rate of the link 108 is 1 in 100,000, then, on average, for every 100,000 data packets transmitted over the link 108, one of the data packets may be dropped. However, based on statistical variation, there is a statistical chance that, when 100,000 data packets are transmitted, all 100,000 of the data packets may be successfully transmitted. Furthermore, there is a statistical chance that more than 1 data packet may be dropped for 100,000 data packets transmitted.

To determine the reliability of the link 108, the originator 111 may generate the test packet 106 with a quantity of nested data packets 110 to exactly test the error rate. For example, if the error rate of the link 108 is 1 in 1,000, then the originator 111 may generate the test packet 106 with a quantity of 1,000 test instances (represented by 1,000 nested data packets 110). If the test packet 106 arrives at the final destination, this may indicate that the link 108 is reliable. However, if the test packet 106 does not arrive at the final destination, it is statistically possible that the error rate is actually less than or equal to 1 in 1,000, but that the error occurred during one of 1,000 test instances anyway.

In some embodiments, to statistically determine the error rate, the originator 111 may send multiple test packets 106 having a quantity of test instances that exactly test the error rate. In some embodiments, to statistically determine the error rate, the originator 111 may send multiple test packets 106 having fewer test instances than the error rate. This may help to provide the originator with samples sufficient to perform a statistical analysis on. For example, if the error rate is 1 in 100,000, the originator 111 may develop 1,000 test packets 106 each having 1,000 nested data packets 110. This may result in 1,000,000 test instances. Based on the number of unreturned test packets 106, this quantity of test packets 106 may provide a greater level of precision in the determined error rate (and associated reliability) of the network.

While embodiments of the present disclosure have been described with respect to two network nodes (e.g., the first network node 102 and the second network node 104), it should be understood that a link 108 between more than two network nodes may be tested using IP-in-IP encapsulated test packets 106. For example, the network 100 may include three network nodes, the first network node 102, the second network node 104, and a third network node. The test packet 106 may be generated using alternating destinations for nested data packets 110. The destinations may alternate between the first network node 102, the second network node 104, and the third network node. For example, a first destination may be the first network node 102, a second destination may be the second network node 104, and third destination may be the third network node. In some embodiments, the third network node may be in communication with the first network node 102, and a fourth destination may be the first network node 102, a fifth destination may be the second network node 104, a sixth destination may be the third network node, and so forth.

In some embodiments, the third network node may not be in communication with the first network node 102, and the fourth destination may be the second network node 104, the fifth destination may be the first network node 102, the sixth destination may be the second network node 104, a seventh destination may be the third network node, and so forth.

Testing more than two network nodes in the same test packet 106 may allow a network engineer or network administrator to determine the reliability of a specific path from the first network node 102 to the final network node. This may help the network engineer to determine routing paths for network traffic.

Figure 2:
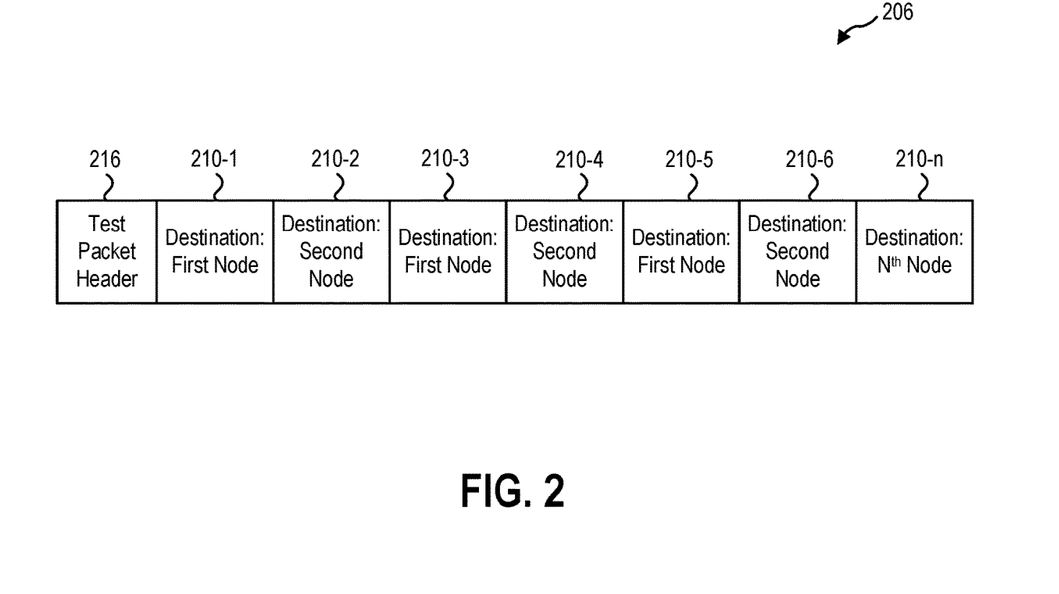
FIG. 2 is a representation of a test packet including a plurality of nested data packets, according to at least one embodiment of the present disclosure.

FIG. 2 is a representation of an IP-in-IP encapsulated test packet 206 that has a plurality of nested data packets (collectively 210). The test packet 206 may include an initial test packet header 216 that includes information about the test packet 206, such as the originating entity, the origin source IP address, any other test packet information, and combinations thereof. In some embodiments, the initial test packet header 216 may include instructions for the initial or first destination network node to remove the initial test packet header 216.

The test packet 206 may further include a plurality of nested data packets 210. Each nested data packet 210 includes a destination, such as a destination IP address. The nested data packets 210 are provided in order. In this manner, the network node that is analyzing the test packet 206 may only be aware of (e.g., able to read header information) of the outermost nested data packet. Each nested data packet 210 may have a header that identifies the destination for the test packet 206. The header may further include instructions for the destination to remove the header, exposing the nested data packet 210 underneath. The next nested data packet 210 may have a new destination, and the network node may forward the test packet 206 to the identified destination.

In the embodiment shown, the test packet 206 has a first nested data packet 210-1 that is exposed when the initial test packet header 216 is removed. The first nested data packet 210-1 may have a first destination of a first network node. The test packet 206 may be transmitted to the first network node according to the destination in the first nested data packet 210-1. The first nested data packet 210-1 may further include instructions for the first network node to remove the header for the first nested data packet 210-1, thereby exposing the second nested data packet 210-2. The second nested data packet 210-2 may have a second destination of the second network node, and the first network node may send the test packet 206 to the second network node according to the second destination in the second nested data packet 210-2.

As may be seen in FIG. 2, this process may be repeated through the plurality of nested data packets 210, including a third nested data packet 210-3, a fourth nested data packet 210-4, a fifth nested data packet 210-5, a sixth nested data packet 210-6, through an nth or final nested data packet 210-n. As may be seen, the destinations shown in successive nested data packets 210 alternate between the first network node and the second network node. The nested data packets 210 are uncovered in the order shown, from left to right, such that the path taken by the test packet 206 follows the destinations shown in order from left to right.

To develop the test packet 206, the network engineer may determine path for the test packet 206 to take (e.g., hop back and forth between the first network node and the second network node). The network engineer may then generate the test packet by creating a nested data packet 210 with a destination for each hop in the path.

The test packet 206 has a final destination in the final test packet 210-*n*. In some embodiments, the final destination may be the first network node or the second network node. In some embodiments, the final destination may be a remote computing device. In some embodiments, the final destination may be the same computing device that generated or provided the test packet 206. In some embodiments, the final test packet 210-*n* may include instructions to communicate receipt of the final test packet 210-*n* to the originator of the test packet 206.

FIG. 3-1 through FIG. 3-5 are representations of a network 300 including a test packet 306 hopping back and forth between a first network node 302 and a second network node 304 across a link 308, according to at least one embodiment of the present disclosure. As may be seen in FIG. 1, the test packet 306 may be initially transmitted to the first network node 302 and may have an initial test packet header 316. The first network node 302 may remove the initial test packet header 316 to reveal a first nested data packet 310-1 having a destination of the second network node 304. The first network node 302 may then transmit the test packet 306 to the second network node 304 according to the destination of the first nested data packet 310-1.

As may be seen in FIG. 3-2, the test packet 306 has been transferred to the second network node 304. The header for the first nested data packet 310-1 may include an instruction to remove the header for the first nested data packet 310-1, revealing the second nested data packet 310-2. The second nested data packet 310-2 has a second destination of the first network node 302, and the second network node 304 may then transmit the test packet 306 back to the first network node 302, as seen in FIG. 3-3. The first network node 302 may then strip away the header of the second nested data packet 310-2, revealing the third nested data packet 310-3 having a destination of the second network node 304. The first network node 302 may then transmit the test packet 306 back to the second network node 304, as seen in FIG. 3-4. The second network node 304 may remove the header of the third nested data packet 310-3, revealing the fourth nested data packet 310-4, and then transmit the test packet 306 back to the first network node 302, as seen in FIG. 3-5.

Figure 35:
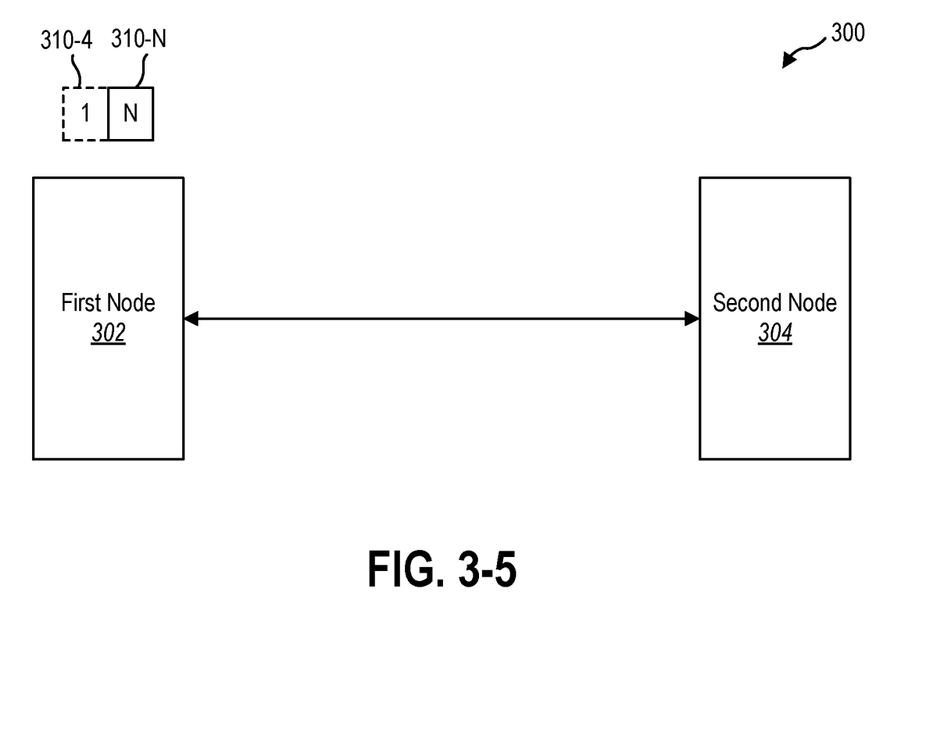

This process may be repeated until the nth or final nested data packet 310-*n* is revealed. In the embodiment shown in FIG. 3-5, the first network node 302 may remove the header for the fourth nested data packet 310-4, revealing the final nested data packet 310-*n*. The first network node 302 may then transmit the test packet 306 to the final destination indicated in the final nested data packet 310-*n*.

Figure 4:
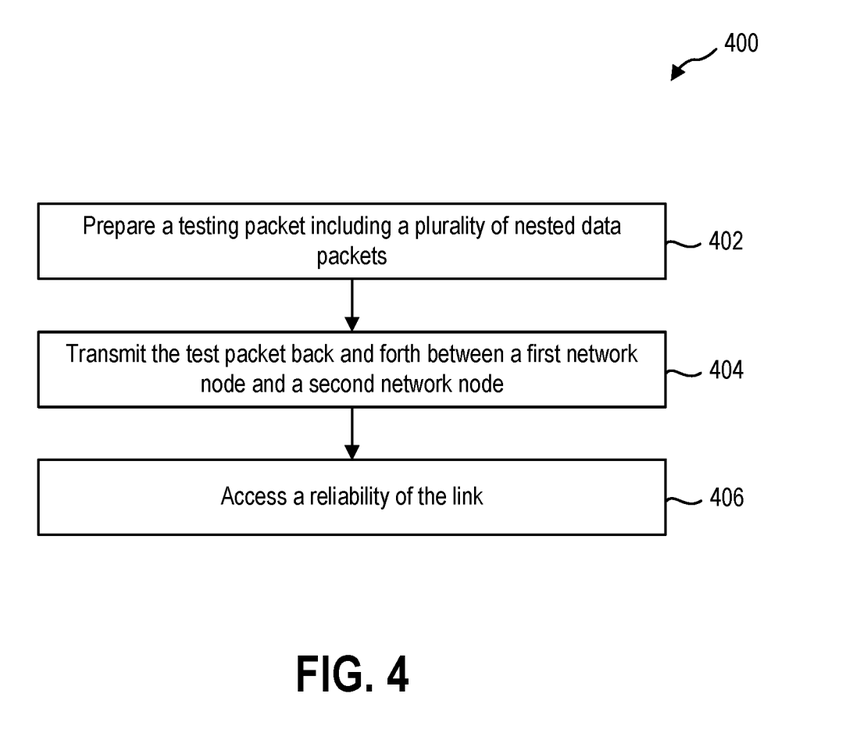
FIG. 4 is a representation of a method for testing a link between two network nodes, according to at least one embodiment of the present disclosure.

FIG. 4 is a representation of a method 400 for increasing a resolution of an error rate detectable on a link between a network connection between a first network node and a second network node, according to at least one embodiment of the present disclosure. The method 400 may be executed or performed on the network 100 of FIG. 1. For example, the originator 111 of FIG. 1 may generate the test packet used in the method 400.

According to embodiments of the present disclosure, the method 400 may include preparing 402 a test packet. The test packet may include a plurality of nested data packets, each of which correspond to a test instance. The nested data packets may each include a destination. The destinations in successive data packets may alternate between the first network node and the second network node. In some embodiments, the test packet may include at least two nested data packets that have a destination of the first network node and two nested data packets that have a destination of the second network node. In some embodiments, the test packet includes over 100 nested data packets that alternate destination between the first network node and the second network node. In some embodiments, the test packet may be prepared by the first network node or the second network node. In some embodiments, the test packet may be prepared at a remote location separate from the first computing device or the second computing device. In some embodiments, a quantity of the nested data packets is dependent upon a maximum packet size of the first network node and the second network node.

The method 400 may further include transmitting 404 the test packet back and forth between the first network node and the second network node across the data plane. The test packet may be transmitted 404 a plurality of times, based on the destination in each nested data packet. Transmitting the test packet along the data plane may increase a quantity of test instances (e.g., a quantity of nested data packets nested in the test packet). This increased quantity of test instances may increase the resolution of the error rate detectable by the network test.

In some embodiments, the method 400 may further include assessing 406 a reliability of the link. The reliability of the link may be based at least in part on whether the packet is received at a final destination. If the test packet is received at the final destination, then the link may be reliable. If the test packet does not arrive at the final destination, then the test packet did not route through each of nested data packets.

Figure 5:
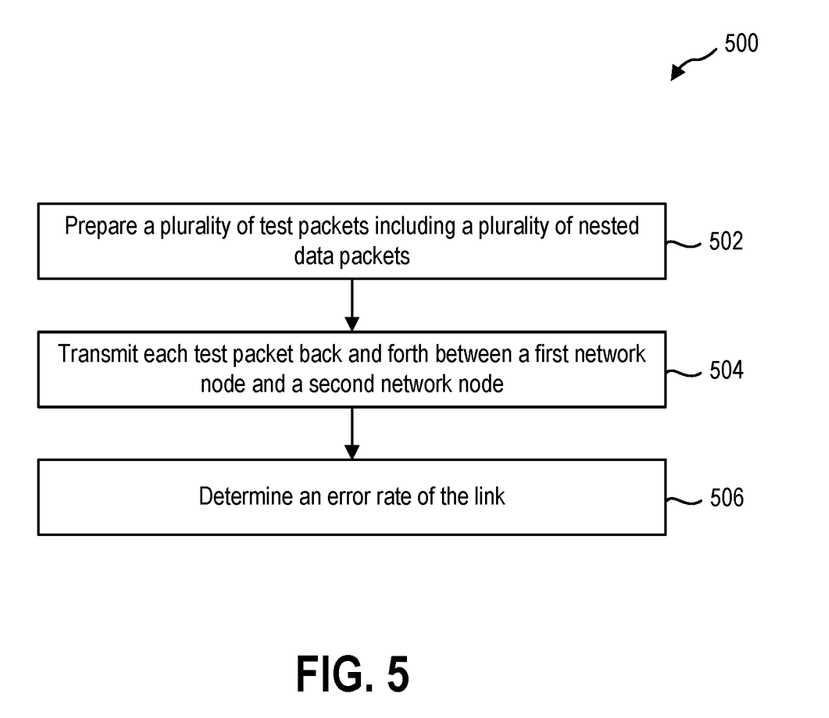
FIG. 5 is a representation of another method for testing a link between two network nodes, according to at least one embodiment of the present disclosure.

FIG. 5 is a representation of a method 500 for increasing a resolution of an error rate detectable on a link between a network connection between a first network node and a second network node, according to at least one embodiment of the present disclosure. The method 500 may be executed or performed on the network 100 of FIG. 1. For example, the originator 111 of FIG. 1 may generate the test packets used in the method 500.

According to embodiments of the present disclosure, the method 500 may include preparing 502 a plurality of test packets. Each test packet may include a plurality of nested data packets, each of which correspond to a test instance. The nested data packets may each include a destination. The destinations in successive data packets may alternate between the first network node and the second network node. In some embodiments, the test packet may include at least two nested data packets that have a destination of the first network node and two nested data packets that have a destination of the second network node. In some embodiments, the test packet may be prepared by the first network node or the second network node. In some embodiments, the test packet may be prepared at a remote location separate from the first computing device or the second computing device. In some embodiments, a quantity of the nested data packets is dependent upon a maximum packet size of the first network node and the second network node. In some embodiments, each test packet may be identical. In other words, each test packet of the plurality of test packets may include the same number and order of nested data packets.

The method 500 may further include transmitting 504 each test packet of the plurality of test packets back and forth between the first network node and the second network node across the data plane. Each test packet may be transmitted 504 a plurality of times, based on the destination in each nested data packet. Transmitting the test packet along the data plane may increase a quantity of test instances (e.g., a quantity of nested data packets nested in the test packet). This increased quantity of test instances may increase the resolution of the error rate detectable by the network test.

An error rate of the link between the first network node may be determined 406 based at least in part on the quantity of returned test packets that are received at the final destination. Determining the error rate of the connection includes tracking which of the test packets arrive at the final destination. In some embodiments, a resolution of the error rate is based on a quantity of the plurality of nested data packets in each test packet of the plurality of test packets.

Figure 6:
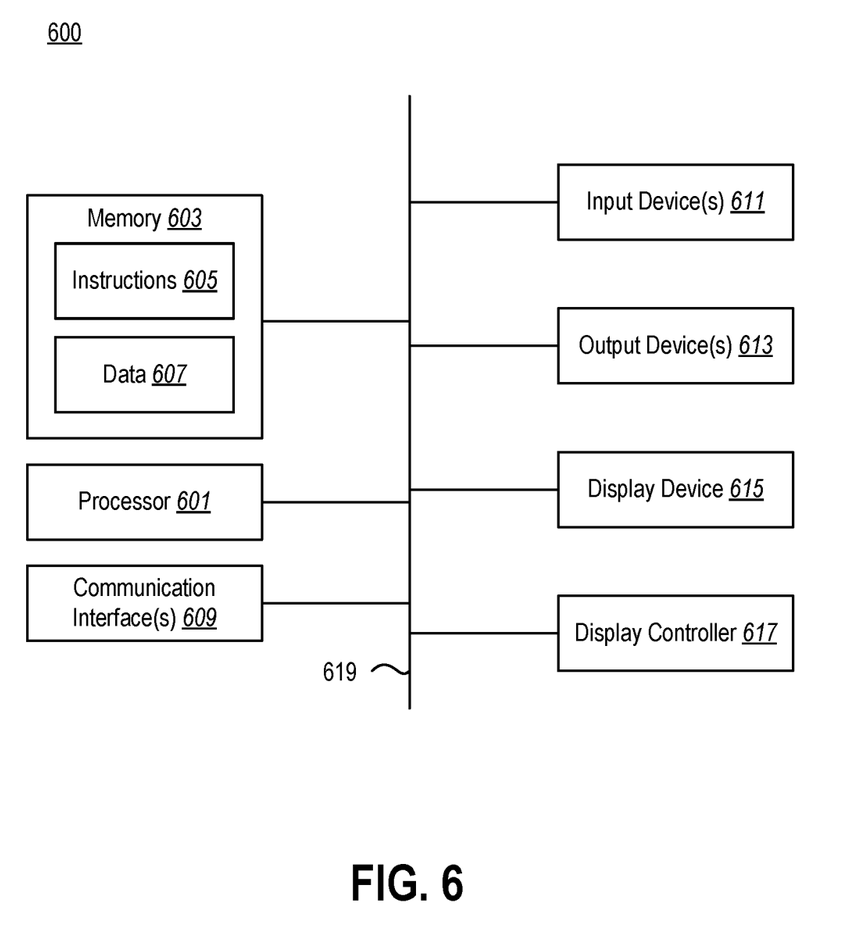
FIG. 6 is a representation of a computing system, according to at least one embodiment of the present disclosure.
Figure 31:
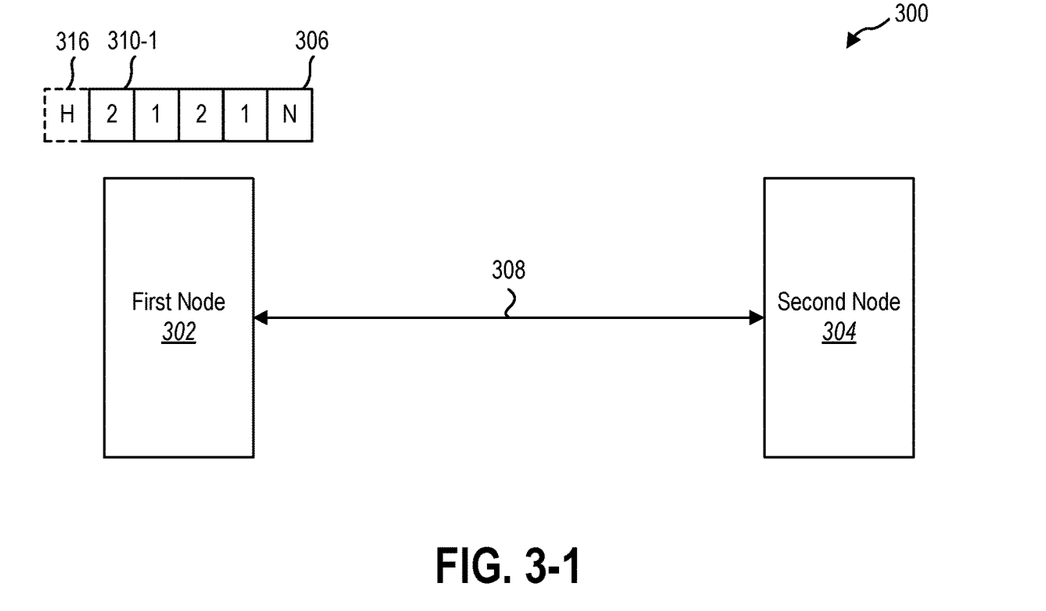
Figure 32:
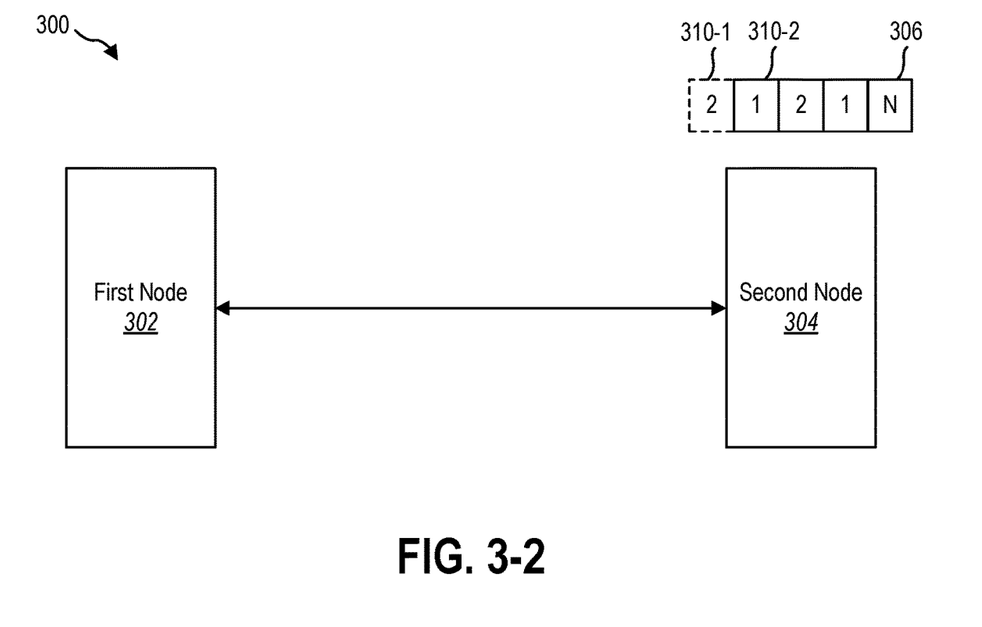
Figure 33:
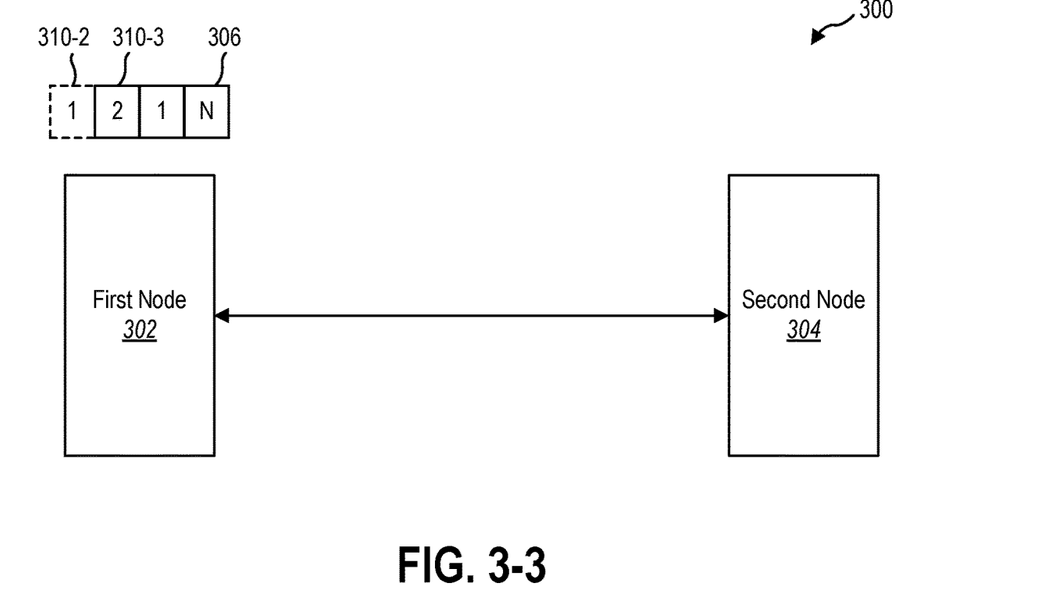
Figure 34:
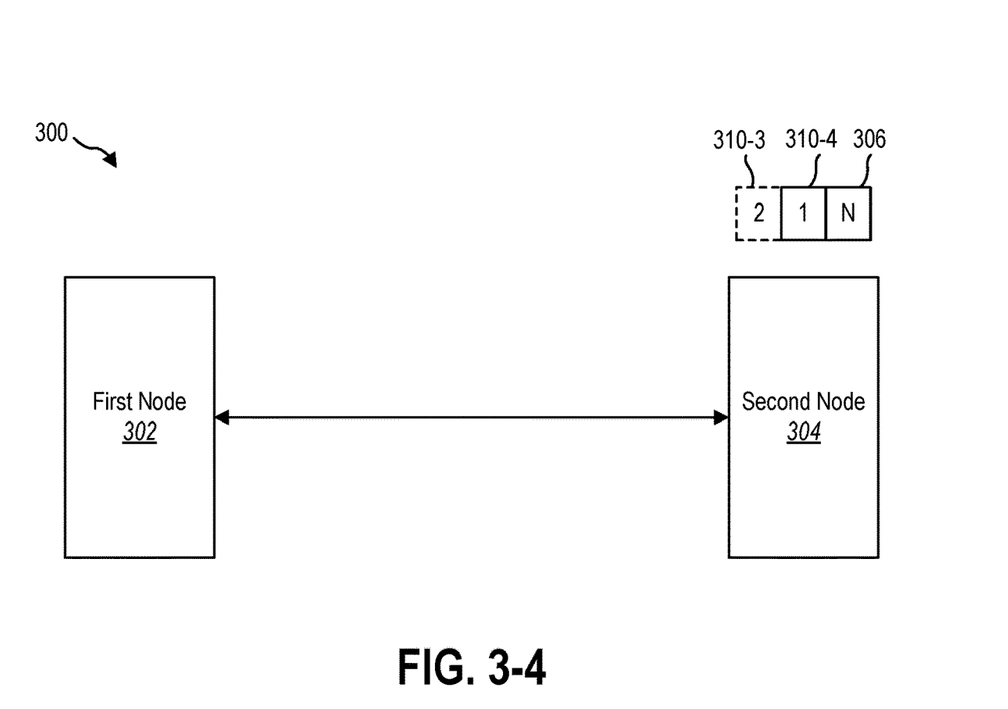

Reference is now made to FIG. 6. One or more computing devices 600 can be used to implement at least some aspects of the techniques disclosed herein. FIG. 6 illustrates certain components that can be included within a computing device 600. The computing device 600 shown in FIG. 6 is an example of the network 100 shown in FIG. 1.

The computing device 600 includes a processor 601 and memory 603 in electronic communication with the processor 601. Instructions 605 and data 607 can be stored in the memory 603. The instructions 605 can be executable by the processor 601 to implement some or all of the methods, steps, operations, actions, or other functionality that is disclosed herein. Executing the instructions 605 can involve the use of the data 607 that is stored in the memory 603. Unless otherwise specified, any of the various examples of modules and components described herein can be implemented, partially or wholly, as instructions 605 stored in memory 603 and executed by the processor 601. Any of the various examples of data described herein can be among the data 607 that is stored in memory 603 and used during execution of the instructions 605 by the processor 601.

Although just a single processor 601 is shown in the computing device 600 of FIG. 6, in an alternative configuration, a combination of processors (e.g., an ARM and DSP) could be used.

The computing device 600 can also include one or more communication interfaces 609 for communicating with other electronic devices. The communication interface(s) 1609 can be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 600 can also include one or more input devices 611 and one or more output devices 613. Some examples of input devices 611 include a keyboard, mouse, microphone, remote control device, button, joystick, trackball, touchpad, and lightpen. One specific type of output device 613 that is typically included in a computing device 600 is a display device 615. Display devices 615 used with embodiments disclosed herein can utilize any suitable image projection technology, such as liquid crystal display (LCD), light-emitting diode (LED), gas plasma, electroluminescence, or the like. A display controller 617 can also be provided, for converting data 607 stored in the memory 603 into text, graphics, and/or moving images (as appropriate) shown on the display device 615. The computing device 600 can also include other types of output devices 613, such as a speaker, a printer, etc.

The various components of the computing device 600 can be coupled together by one or more buses, which can include a power bus, a control signal bus, a status signal bus, a data bus, etc. For the sake of clarity, the various buses are illustrated in FIG. 6 as a bus system 619.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

As an example, the term "circuitry" can refer to one or more integrated circuits, where an integrated circuit can include a set of electronic circuits on a piece of semiconductor material (e.g., silicon). In some embodiments, circuitry can include programmable logic devices such as field programmable gate arrays (FPGAs) and/or complex programmable logic devices (CPLDs). In some embodiments, circuitry can include application specific integrated circuits (ASICs). As another example, the term "circuitry" can refer to one or more discrete electronic circuits that include individual electronic components. As another example, the term "circuitry" can refer to a digital circuit, an analog circuit, or a mixed-signal circuit. "Circuitry" can also include combinations of the foregoing.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

Systems and methods according to the present disclosure may be performed using any of the technological systems described herein. Furthermore, embodiments of the present disclosure may be implemented using computing technology, hardware and software, not currently available, or which may become available in the future.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for increasing a resolution of an error rate detectable on a link between a network connection between a first network node and a second network node, the method comprising:
   preparing a test packet, wherein the test packet includes a plurality of nested data packets, each nested data packet corresponding to a test instance, each nested data packet including a destination, the destination in successive nested data packets alternating between the first network node and the second network node, wherein the plurality of nested data packets includes a high volume of nested data packets;
   transmitting the test packet back and forth between the first network node and the second network node across a data plane a plurality of times according to the destination in each nested data packet, thereby increasing a quantity of test instances relative to test transmissions on a control plane, wherein the resolution of the error rate is based at least in part on the quantity of the test instances; and
   assessing a reliability of the link based at least in part on whether the test packet is received at a final destination, wherein the reliability of the link is based at least in part on the resolution of the error rate.

2. The method of claim 1, wherein assessing the reliability of the link includes determining whether the test packet has been received at the final destination.

3. The method of claim 2, wherein, if the test packet does not arrive at the final destination, then the test packet did not route through each of the plurality of nested data packets.

4. The method of claim 1, wherein the test packet includes at least two nested data packets having destinations of the first network node and at least two nested data packets having destinations of the second network node.

5. The method of claim 1, wherein the high volume of nested data packets includes over 100 nested data packets alternating the destination between the first network node and the second network node.

6. The method of claim 1, wherein preparing the test packet includes preparing the test packet at the first network node.

7. The method of claim 1, wherein preparing the test packet includes preparing the test packet at a remote location separate from the first network node or the second network node.

8. The method of claim 1, wherein a quantity of the plurality of nested data packets is based on a maximum packet size of the first network node and the second network node.

9. The method of claim 1, wherein the plurality of nested data packets are nested Internet Protocol (IP) packets.

10. A method for increasing a resolution of an error rate detectable on a link between a network connection between a first network node and a second network node, the method comprising:
    preparing a plurality of test packets, each test packet of the plurality of test packets including a plurality of nested data packets corresponding to a test instance, wherein each nested data packet in a test packet includes a destination, the destination in successive nested data packets in each test packet alternating between the first network node and the second network node;
    transmitting each test packet of the plurality of test packets back and forth between the first network node and the second network node across a data plane a plurality of times according to the destination in each nested data packet, thereby increasing a volume of test instances relative to test transmissions on a control plane, wherein the resolution of the error rate is based at least in part on a quantity of the test instances; and
    determining the error rate of the link based at least in part on a quantity of returned test packets of the plurality of test packets received at a final destination.

11. The method of claim 10, wherein determining the error rate of the link includes tracking which test packets of the plurality of test packets arrive at a final destination.

12. The method of claim 10, wherein the resolution of the error rate is based on a quantity of the plurality of nested data packets in each test packet of the plurality of test packets.

13. The method of claim 10, wherein each test packet of the plurality of test packets includes at least two nested data packets having destinations of the first network node and at least two nested data packets having destinations of the second network node.

14. The method of claim 10, wherein each test packet of the plurality of test packets has the same plurality of nested data packets.

15. A system for increasing a resolution of an error rate detectable on a link between a network connection between a first network node and a second network node, the system comprising:
    one or more processors;
    memory in electronic communication with the one or more processors; and
    instructions stored in the memory, the instructions being executable by the one or more processors to:
      prepare a plurality of test packets, each test packet of the plurality of test packets including a plurality of nested data packets corresponding to a test instance, wherein each nested data packet in a test packet includes a destination, the destination in successive nested data packets in each test packet alternating between the first network node and the second network node;

transmit each test packet of the plurality of test packets back and forth between the first network node and the second network node across a data plane a plurality of times according to the destination in each nested data packet, thereby increasing a volume of test instances relative to test transmissions on a control plane, wherein the resolution of the error rate of the link is based at least in part on a quantity of the test instances; and determine the error rate of the link based at least in part on a quantity of returned test packets of the plurality of test packets received at a final destination.

16. The system of claim 15, wherein the instructions further cause the processor to track which test packets of the plurality of test packets arrive at the final destination when determining the error rate.

17. The system of claim 15, wherein the resolution of the error rate is based on a quantity of the plurality of nested data packets in each test packet of the plurality of test packets.

18. The system of claim 15, wherein each test packet of the plurality of test packets includes at least two nested data packets having destinations of the first network node and at least two nested data packets having destinations of the second network node.

19. The system of claim 15, wherein each test packet of the plurality of test packets has the same plurality of nested data packets.

20. The system of claim 15, wherein the test packet is prepared at a remote location separate from the first network node and the second network node.

* * * * *